(12) United States Patent
Stephens

(10) Patent No.: US 10,804,836 B2
(45) Date of Patent: Oct. 13, 2020

(54) PARALLEL USE OF SOFT STARTERS

(71) Applicant: MOTORTRONICS UK LIMITED, Ivybridge, Devon (GB)

(72) Inventor: Gary Stephens, Devon (GB)

(73) Assignee: MOTORTRONICS UK LIMITED (GB)

( * ) Notice: Subject to any disclaimer, the term of this patent is extended or adjusted under 35 U.S.C. 154(b) by 310 days.

(21) Appl. No.: 16/063,484

(22) PCT Filed: Dec. 16, 2016

(86) PCT No.: PCT/EP2016/081475
§ 371 (c)(1),
(2) Date: Jun. 18, 2018

(87) PCT Pub. No.: WO2017/103140
PCT Pub. Date: Jun. 22, 2017

(65) Prior Publication Data
US 2020/0162010 A1    May 21, 2020

(30) Foreign Application Priority Data

Dec. 18, 2015    (GB) .................................. 1522376.1

(51) Int. Cl.
*H02P 29/032*    (2016.01)
*H02P 29/60*    (2016.01)
*H02P 1/04*    (2006.01)

(52) U.S. Cl.
CPC .............. *H02P 29/032* (2016.02); *H02P 1/04* (2013.01); *H02P 29/60* (2016.02)

(58) Field of Classification Search
CPC ............................... H02P 29/032; H02P 29/60
(Continued)

(56) References Cited

U.S. PATENT DOCUMENTS 7,345,449 B2 *    3/2008    Barie .................... H02P 27/16
318/727

FOREIGN PATENT DOCUMENTS

| CN | 203399022 U | 1/2014 |
| CN | 104660111 A | 5/2015 |
| SU | 1396206 A1 | 5/1988 |

OTHER PUBLICATIONS

Circuits Today, "SCR-Series and Parallel Connections", https://www.circuitstoday.com/scr-series-and-parallel-connections, Sep. 14, 2009, 8 pages.

(Continued)

*Primary Examiner* — David Luo
(74) *Attorney, Agent, or Firm* — Dorsey & Whitney LLP

(57) ABSTRACT

A system for controlling an AC motor is provided. The system comprises an electrical connection path for connecting an electrical input of the AC motor to a first phase of alternating current from an electric power supply. The system also comprises two or more motor controllers, each motor controller is located on the electrical connection path between the electric power supply and the AC motor and is operable to regulate current of the first phase passing through it. Each motor controller is connected in parallel, relative to the other motor controllers, to the electrical connection path. At least one processor is configured to control the motor controllers to repeatedly change which of the motor controllers current of the first phase passes through, such that at any given time current of the first phase only passes through one of the motor controllers. A corresponding method is also provided.

20 Claims, 9 Drawing Sheets

(58) Field of Classification Search
USPC .................................................. 318/434, 34
See application file for complete search history.

(56) References Cited

OTHER PUBLICATIONS

PCT, "International Search Report and Written Opinion", Application No. PCT/EP2016/081475, dated Jun. 13, 2017, 12 pages.

* cited by examiner

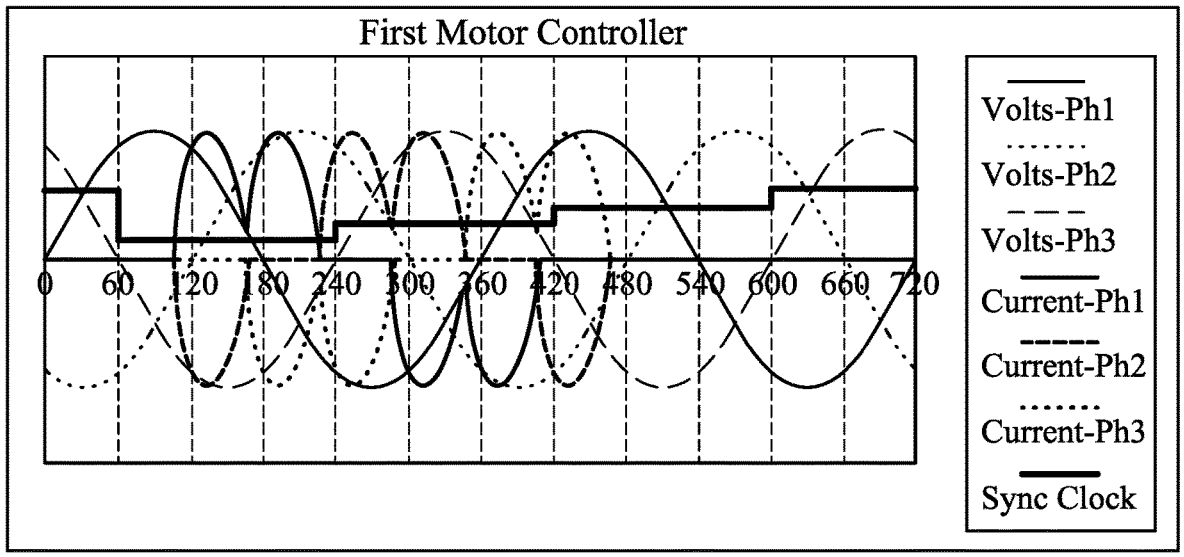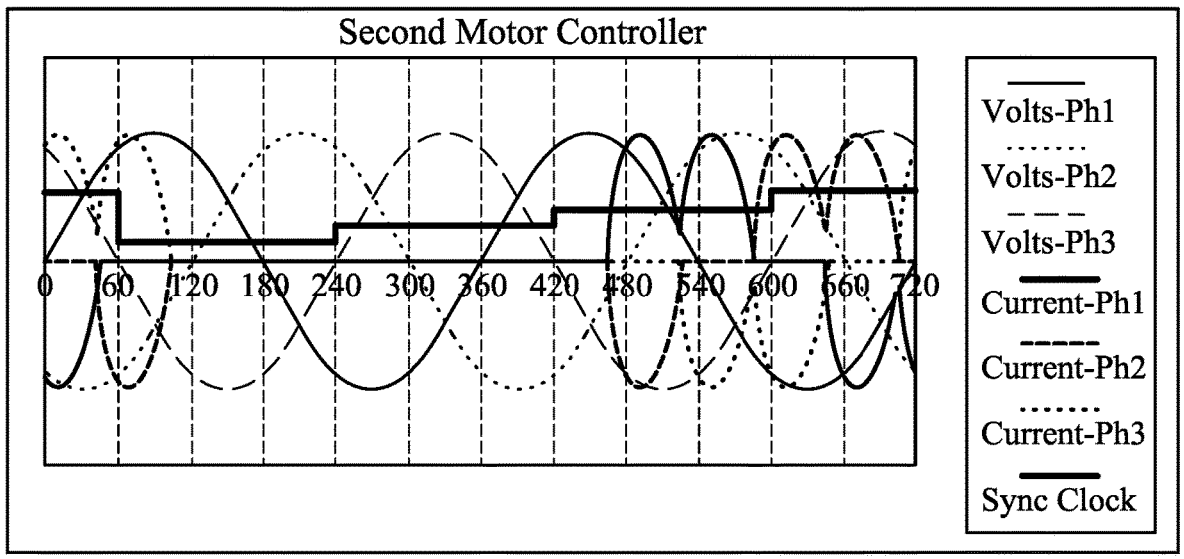
Figure 9

PARALLEL USE OF SOFT STARTERS

CROSS-REFERENCES TO RELATED APPLICATION

The present application is a U.S. National Stage entry under 35 U.S.C. § 371 of International Application No. PCT/EP2016/081475, filed Dec. 16, 2016, which claims the benefit of GB 1522376.1, filed Dec. 18, 2015, the disclosures of which are incorporated by reference herein in their entireties and for all purposes.

TECHNICAL FIELD

The present invention relates to the control of AC motors using motor controllers, particularly soft starters.

BACKGROUND

Electric motors are well known devices for converting electrical energy to mechanical energy. Alternating current (AC) motors, such as the standard three-phase induction motor, make use of an AC supply to generate mechanical energy. An AC motor includes a stationary "stator" which receives alternating current from a supply, and a rotatable "rotor" coupled to an output shaft of the motor. The alternating current in the stator generates a rotating magnetic field which induces a second alternating current in the rotor. Since the current in the rotor is located in the magnetic field of the stator, the rotor experiences a torque which causes it to rotate.

Smaller AC motors may be started by simply connecting the motor to a power supply.

Larger AC motors, however, usually require the use of a motor controller to start. When a motor starts it will draw a high current from the power supply, typically six to seven times greater than the current drawn during steady state operation. As well as potentially damaging the power supply and the windings of the stator, a high initial current can create a high rotor torque that may cause mechanical damage to the motor. Some motor controllers therefore regulate the current and voltage supplied to the motor during start-up to avoid damage to the motor and to accelerate the motor to its operating speed smoothly.

Various types of motor controller are known, including so-called "soft starters". Many soft starters make use of silicon controlled rectifiers (SCRs), also known as thyristors. An SCR is a three terminal solid-state switching device which will only conduct current in a single direction. Once switched on (which is achieved by applying a voltage to the third terminal, called the gate), an SCR will conduct until the voltage across the main two terminals returns to zero, which conveniently occurs at the end of every AC half-cycle. A typical soft starter includes, for each AC phase, a pair of SCRs connected in anti-parallel. One SCR of the pair handles the positive AC half-cycle, while the other SCR of the pair handles the negative half-cycle. By controlling the point of the half-cycle at which an SCR is switched on (the "firing angle", which is between 0 and 180 degrees), it is possible to control how much of an AC half-cycle is supplied to the motor. The firing angle can be decreased over time until the firing angle is zero and the entire AC half-cycle is supplied to the motor.

FIG. 1 shows a typical prior art soft starter (110) connected to a three-phase power supply (130) and a three-phase motor (150). The soft starter (110) includes three anti parallel pairs of SCRs (111, 112, 113), one for each of the three phases. There are three electrical connection paths (141, 142, 143) connecting the three-phase power supply (130) to the three-phase motor (150), one electrical connection path per phase. Each of the anti-parallel pairs of SCRs (111, 112, 113) is located on one of electrical connection paths (141, 142, 143) between the three-phase power supply (130) and the three-phase motor (150). It can also be seen that each anti-parallel pair of SCRs (111, 112, 113) is connected in parallel to a bypass relay/switch. The current rating of the soft starter (110) will be greater than or equal to the current rating of the AC motor (150).

To start the three-phase motor (150), three-phase power supply (130) supplies current to the motor via the soft starter (110). For each phase, the respective pair of anti-parallel SCRs (111, 112, 113) regulates the current passing to the motor over the respective electrical connection path (141, 142, 143). For each phase, one SCR of the anti-parallel pair handles the positive AC half-cycle, while the other SCR of the anti-parallel pair handles the negative AC half-cycle. One or more processors, not shown in FIG. 1, will control the firing angle of the SCRs. Initially the firing angles will be large so that current is only delivered to the motor for a relatively small fraction of an AC half-cycle. Over time the firing angle will be decreased so that current is delivered to the motor over an increasingly large fraction of the AC half-cycle. Eventually the bypass relays can be closed to short-circuit the SCRs and connect the motor directly to the power supply.

One problem associated with the use of motor controllers such as soft starters is that as the current rating (or voltage rating or power rating) of the motor is increased, the current rating of the motor controller must also increase. Manufacturers must therefore manufacture motor controllers with a wide range of current ratings, and stockists must stock motor controllers with a wide range of current ratings, even though motor controllers with higher current ratings are typically less in demand because they have fewer practical applications.

The present inventors have appreciated that it would be useful to provide a way of controlling an AC motor, such as soft starting an AC motor, without the need for a motor controller with a current rating that matches or exceeds the current rating of the AC motor.

The present inventors have appreciated that it would be useful to provide a way of prolonging the life of motor controllers.

The present inventors have appreciated that a solution could be to connect two motor controllers in parallel such that current of a particular phase is shared between two pairs of anti-parallel SCRs (i.e. for two identical motor controllers, half of the current passes through an anti-parallel pair of a first motor controller and the other half passes through an anti-parallel pair of a second motor controller). Although sharing the current in this way reduces the required current rating of the motor controllers, in practice it has been found difficult to implement. Differences in dynamic resistance and gate turn on delays of SCRs, as well as the requirement to fire the SCRs of two motor controllers at the same time, cause problems. Whilst the present inventors have appreciated that it is possible to carefully match the SCRs and use additional circuits to alleviate these problems, this is expensive and technically difficult to achieve.

United States Patent Application publication number US 2013/0334998 describes a system for soft starting an AC motor using a variable frequency drive (VFD) with a voltage rating that is lower than the voltage rating of the AC motor. A VFD is connected between an AC motor and a utility power source, with the terminals of the VFD facing the AC motor being "tapped" to the windings of the motor so that the VFD is not exposed to the full impedance of the motor. Once the motor has been soft started, a first set of switches between the VFD and motor are opened and a second set of switches connecting the utility power supply to the full impedance of the motor windings are closed. Whilst this approach does allow an AC motor to be soft started with a VFD with a lower voltage rating than the voltage rating of the motor, it requires tapped winding connections to be connected to the motor. This requires the motor to be opened up to provide access to the windings, which may be impractical or undesirable. Further, the approach is not amenable to use with SCR-based motor controllers, which are widely used for soft starting.

SUMMARY OF THE INVENTION

The invention is defined in the independent claims to which reference is now directed. Preferred features are detailed in the dependent claims.

According to a first aspect of the present invention there is provided a system for controlling an AC motor. The system comprises an electrical connection path for connecting an electrical input of the AC motor to a first phase of alternating current from an electric power supply. The system further comprises two or more motor controllers. Each motor controller is located on the electrical connection path between the electric power supply and the AC motor. Each motor controller is operable to regulate current of the first phase passing through each respective motor controller. Each motor controller is connected in parallel, relative to the other motor controllers, to the electrical connection path. The system further comprises at least one processor configured to control the motor controllers to repeatedly change which of the controllers current of the first phase passes through, such that at any given time current of the first phase over the electrical connection path only passes through one of the motor controllers.

Connecting two or more motor controllers in parallel and controlling them to repeatedly change which of the motor controllers current of a first phase passes through, such that at any given time current of the first phase over the electrical connection path only passes through one motor controller, provides a number of advantages.

Each controller will be conducting the full current of the first phase for some of the time, but at other times will conduct zero current. This means that the average current and root mean squared (RMS) current experienced by each motor controller, taken over a sufficiently large number of AC cycles, will be less than the average current and RMS current that would be experienced if only one motor controller was used. It is the average current and RMS current which contribute to heating, and it is therefore the average current and RMS current which determine whether the design limits of a motor controller are exceeded. Repeatedly changing which controller current of a phase passes through, such that at any given time current of the phase over the electrical connection path only passes through one motor controller, therefore allows a motor to be controlled by two or more motor controllers with current ratings lower than the current rating of the motor. Even where the motor controllers have current ratings greater than or equal to the current rating of the motor, repeatedly changing which controller current of a phase passes through is advantageous. Since the average and RMS currents are still reduced compared to the use of a single controller, thermal wear of the motor controllers is reduced, potentially increasing their working life.

Repeatedly changing which controller current of a first phase passes through, such that at any given time current of the first phase over the electrical connection path only passes through one motor controller also alleviates issues experienced in other systems in which motor controllers are connected in parallel. Unlike other systems, according to embodiments of the present invention only one motor controller is conducting current of a given phase at any given time. It is therefore not, for example, necessary to simultaneously fire SCRs of two different motor controllers on the same electrical connection path, and differences in dynamic resistance and gate delays do not present such a problem.

In some implementations, the current ratings of the motor controllers are de-rated such that the sum of the current ratings of the motor controllers is greater than the current rating of the AC motor. De-rating the current ratings of the motor controllers can increase the working life of the motor controllers.

The motor controllers can be de-rated to take into account one or more factors, including the thermal performance of components of the motor controllers (such as silicon controlled rectifiers), the power dissipated by components of the motor controllers and the variation in contact resistance of bypass relays of the motor controllers.

The at least one processor may be configured to control the motor controllers in such a way that the respective thermal limit of each respective motor controllers is not exceeded, and/or so that the thermal load on each motor controller is balanced. Passing current through a motor controller causes heating, and if the heating caused by the current exceeds a thermal limit of the motor controller, the motor controller may be damaged. It is therefore advantageous to repeatedly change the motor controller through which current of a phase passes to avoid excessive heating in the motor controller. In order to balance the thermal load, and to avoid exceeding the thermal limit, the at least one processor may be configured to control the motor controllers so that the fraction of time current of the first phase passes through each respective motor controller is substantially equal to the ratio of the current rating of the respective controller and the sum of the current ratings of all of the motor controllers.

The at least one processor may be configured to control the motor controllers to repeatedly change the controller that current of the first phase passes through on a cycle-to-cycle basis. Controlling the motor controllers on a cycle-to-cycle basis allows fine control of the thermal load of the motor controllers.

The at least one processor may be configured to control the motor controllers to repeatedly change the controller that current of the first phase passes through according to a predefined sequence. Using a predefined sequence allows the thermal load of each motor controller to be controlled according to a predefined plan. For example, a sequence may be chosen to avoid exceeding the thermal limits of any of the motor controllers, and may be based on the number of motor controllers, the current ratings of the individual motor controllers, and the current rating of the motor.

The at least one processor may be configured to periodically repeat the predefined sequence. The number of AC cycles in a period may be an integer multiple of the number of controllers.

Each of the motor controllers may comprise an internal clock. In some implementations in which each motor controller comprises an internal clock, the one or more processors control the motor controllers such that current of the first phase only passes through a respective motor controller when a count of the respective internal clock is equal to one or more predefined values. The predefined values may be representative of the predefined sequence. The frequency of the internal clocks may be equal to the frequency of the first phase of alternating current, or may be equal to half the frequency of the first phase of alternating current.

In some implementations in which each of the motor controllers comprises an internal clock, the least one processor is configured to synchronize the internal clocks. Synchronizing the internal clocks may involve using a logic edge derived at least in part from a voltage or current waveform of the first phase of the supply.

Synchronizing the internal clocks is particularly advantageous where the at least one processor that controls the motor controllers is controllable such that current of the first phase only passes through a respective motor controller when a count of the respective internal clock is equal to one or more predefined values. Where the internal clocks are synchronized, each motor controller can rely on its internal clock and a predefined firing sequence, avoiding the need for firing signals to be sent to each respective motor controller when it is the turn of the respective motor controller to pass current.

In some implementations, one of the motor controllers is a master controller and all remaining motor controllers are slave controllers. In this case, the master controller is configured to provide control of the slave controllers over one or more control connections.

In some implementations, the master controller provides control data to the slave controller over the one or more control connections to repeatedly change which of the motor controllers current of the first phase passes through, such that at any given time current of the first phase over the electrical connection path only passes through one of the motor controllers. In other implementations, the master controller and respective slave controllers may be configured to exchange signals for synchronizing the internal clocks of the motor controllers.

Control connections may comprise serial connections and/or one or more hardware handshake lines. The master controller and respective slave controllers may be configured to exchange signals for synchronizing the internal clocks of the motor controllers over the one or more hardware handshake lines, and may be configured to exchange operating parameters over the serial connections. The master controller may be configured to provide firing angles for SCRs of the slave controllers over the respective serial connections, and may do so cyclically. The master controller may be configured to provide an initialization telegram to the slave controllers.

Using hardware handshake lines to synchronize the internal clocks of the motor controllers is advantageous as communications over a serial connection may be too slow or unreliable.

The invention is not limited to one phase of current. In some implementations the system further comprises one or more additional electrical connection paths, each additional electrical connection path for connecting an electrical input of the AC motor to an additional phase of alternating current from the power supply. In this case, each of the motor controllers will also be located on each of the additional electrical connection paths between the electric power supply and the AC motor and will be operable to regulate current of a corresponding additional phase passing through each respective motor controller. Each of the plurality of motor controllers will be connected in parallel, relative to the other controllers, to each respective electrical connection path. The at least one processor will be further configured to control the motor controllers to repeatedly change the controller through which current of additional phases passes, such that at any given time current of each respective additional phase over the respective connection path only passes through one of the plurality of motor controllers. In some implementations the AC motor will be a three-phase motor, in which case there are two additional electrical connection paths.

The skilled person will understand that while many of the optional features have been described with respect to a single phase of alternating current, they could equally be applied to a system in which there is one or more additional phases of alternating current. Indeed, an application of embodiments of the present invention is the control of a three-phase motor. What is important is that for each respective phase of current used in the system, the motor controller through which current of that respective phase passes is repeatedly changed and that at any given time the current of that respective phase only passes through one motor controller.

In some implementations, the motor controllers utilise silicon controlled rectifiers. For each electrical connection path, each motor controller may comprise a pair of SCRs connected in anti-parallel.

The skilled person will also appreciate that while embodiments of the invention are described in terms of the control of an AC motor using motor controllers, such as motor controllers using SCRs, the embodiments of the invention could also be applied to the control of other devices using SCR-based controllers connected in parallel. For example, embodiments of the invention may be used to control DC bridges, lighting and heaters.

According to another aspect of the present invention, there is provided a method of controlling an AC motor. The method comprises controlling two or more motor controllers. Each of the motor controllers is located on an electrical connection path between the AC motor and a power supply configured to supply a first phase of alternating current over the electrical connection path. Each of the motor controllers is operable to regulate current of a first phase passing through the respective motor controller. Each of the motor controllers is connected in parallel, relative to the other motor controllers, to the electrical connection path. Controlling the motor controllers comprises repeatedly changing which motor controller current of the first phase passes through, such that at any given time current of the first phase over the electrical connection path only passes through one of the motor controllers.

BRIEF DESCRIPTION OF THE DRAWINGS

Examples of the invention will now be described in more detail with reference to the accompanying drawing in which:

FIG. 9 illustrates the operation of two motor controllers according to an embodiment of the invention.

DETAILED DESCRIPTION OF PREFERRED EMBODIMENTS

Figure 2:
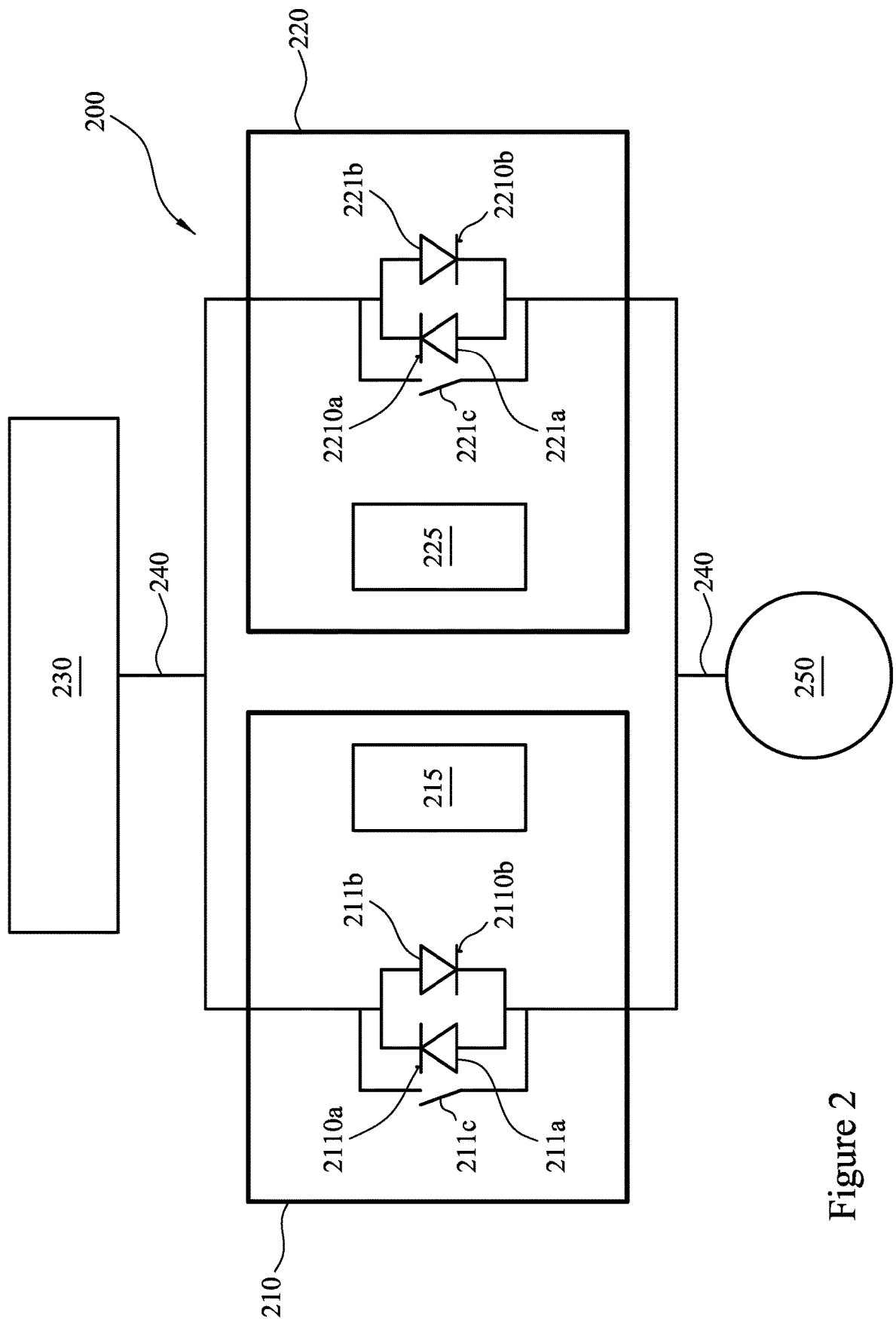
FIG. 2 is a schematic diagram of a system for controlling an AC motor according to an embodiment of the invention.

FIG. 2 shows a system (200) for controlling an AC motor (250) using two motor controllers (210, 220).

The AC motor (250) is powered by a single phase of alternating current supplied by an electric power supply (230). The single phase of alternating current is delivered over an electrical connection path (240) that connects the electric power supply (230) to the AC motor (250). The two motor controllers (210, 220) are electrically connected in parallel on the electrical connection path (240), and are located between the electric power supply (230) and the AC motor (250).

The first motor controller (210) includes a first SCR (211a), a second SCR (211b) connected in anti-parallel to the first SCR (211a), and a bypass relay/switch (211c) connected in parallel to the first and second SCRs (211a, 211b). Each of the two SCRs (211a, 211b) includes first and second main terminals (the anode and cathode), and a gate terminal (2110a, 2110b). The main terminals of the first SCR (211a), the main terminals of the second SCR (211b) and the bypass relay (211c) are the elements of the first motor controller (210) that are electrically connected to the electrical connection path (240) between the power supply (230) and the motor controller (250). As explained previously, an SCR can only conduct current in one direction. Since the polarity of alternating current changes every half-cycle, one of the two SCRs (211a, 211b) is capable of conducting current for positive AC half-cycles while the other SCR, connected in anti-parallel to the first SCR, is capable of conducting current for negative AC half-cycles.

The first motor controller (210) also includes a microcontroller (215). The microcontroller (215) controls the operation of the SCRs (211a, 211b) and the bypass relay (211c). In particular, the microcontroller (215) can control whether a voltage is applied to the gates (2110a, 2110b) of the SCRs. As explained previously, an SCR will only conduct current when a switching voltage is applied to its gate terminal, after which the SCR will conduct current until the voltage between the anode and cathode returns to zero, which occurs after each AC half-cycle. The microcontroller can therefore regulate the current passing through the motor controller by controlling whether and when each of the two SCRs (211a, 211b) can conduct current. The microcontroller can also control whether the bypass relay (211c) is open or closed. When the bypass relay is closed, the two SCRs (211a, 211b) are short-circuited and current will pass through the closed bypass relay rather than the SCRs.

The second motor controller (220) includes the same components as the first motor controller (210). In particular, the second motor controller (220) includes a first SCR (221a), a second SCR (221b) connected in anti-parallel to the first SCR, and a bypass relay/switch (221c) connected in parallel to the first and second SCRs (221a, 221b). Each of the SCRs (221a, 221b) includes two main terminals (the anode and cathode) and a gate terminal (2210a, 2210b). The main terminals of the first SCR (221a), the main terminals of the second SCR (221b) and the bypass relay (221c) are the elements of the second motor controller (220) that are electrically connected to the electrical connection path (240) between the power supply (230) and the motor controller (250). The second motor controller (220) also includes a microcontroller (225). The microcontroller (225) controls the operation components of the second microcontroller (220) as described above for the first motor controller (210).

Figure 1:
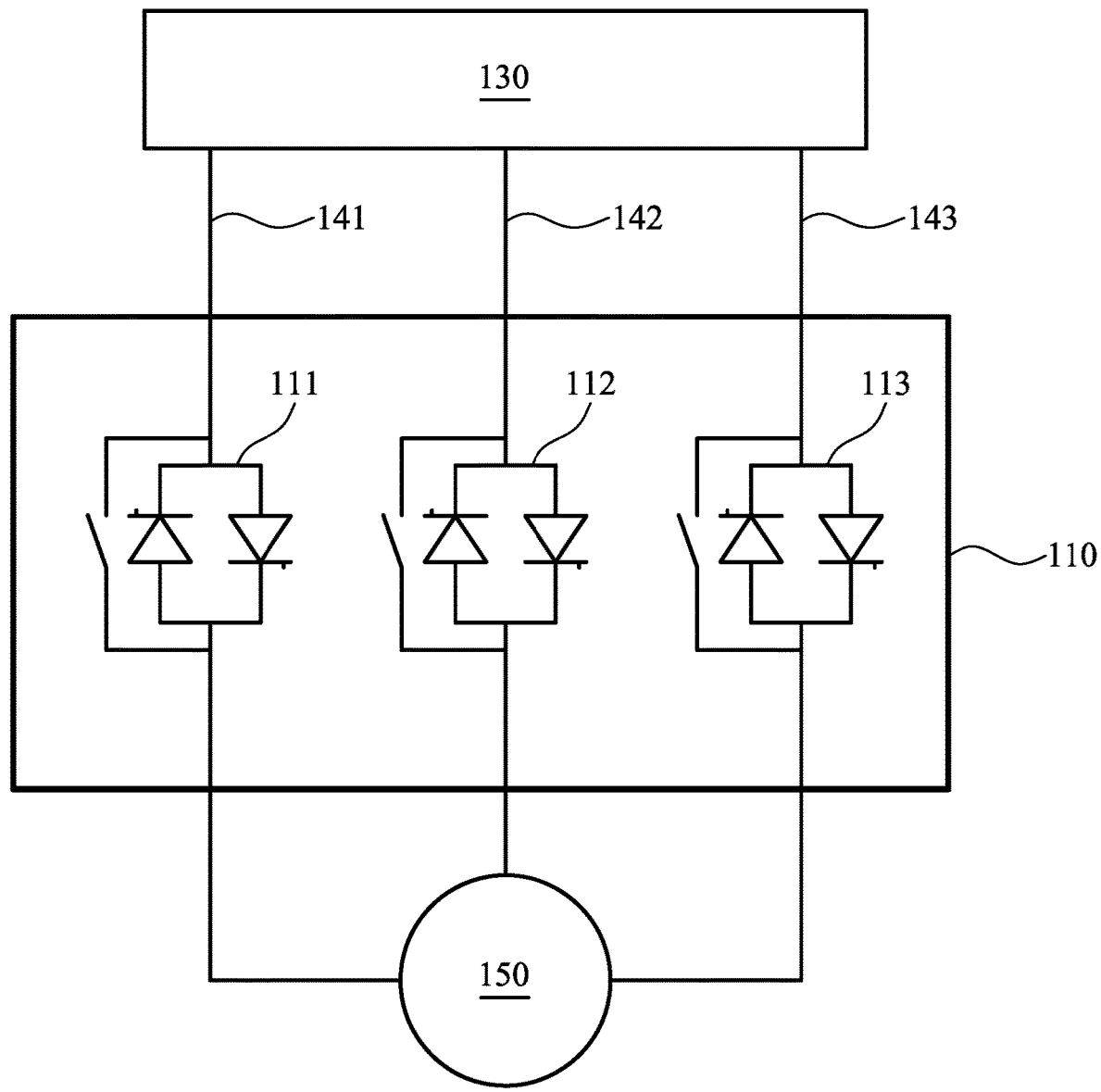
FIG. 1 is a schematic diagram of a prior art system for soft starting a three-phase motor.

The two motor controllers (210, 220) are configured to, in combination, soft-start the AC motor (250). As with prior art systems which make use of a single motor controller, such as the system described above with respect to FIG. 1, the motor controllers (210, 220) control how current is delivered to the AC motor (250) from the power supply (230) during start-up. Initially, the firing angles of the SCRs (211a, 211b, 221a, 221b), which are controlled by the microcontrollers (215, 225), will be relatively large such that the AC motor (250) only receives current for a relatively small fraction of each AC half-cycle. Over time, the firing angles of the SCRs (211a, 211b, 221a, 221b) are decreased such that the AC motor (250) receives current for an increasingly large fraction of each AC half-cycle.

Eventually the AC motor (250) is ready to receive the full current from the power supply (230). At this point, the bypass relays (211c, 221c) are closed to short-circuit the SCRs (211a, 211b, 221a, 221b). It will be understood that it is advantageous to short-circuit the SCRs following the soft start to avoid their impedance. However, it is not essential, and it will be understood that the bypass relays are not essential to the operation of SCR-based motor controllers.

In prior art systems which only include one motor controller, such that there is only one anti-parallel pair of SCRs per phase, each anti-parallel pair conducts current during every AC cycle (for the duration of the soft start). More specifically, one SCR of the anti-parallel pair conducts current during every positive AC half-cycle, while the other SCR of the anti-parallel pair conducts during every negative AC half-cycle. The present inventors have appreciated that this method of operation, in which each anti-parallel pair conducts during every AC cycle, cannot readily be extended to systems in which two motor controllers are connected together in parallel. This is because it becomes necessary to fire two SCRs connected in parallel, one per motor controller, simultaneously, by simultaneously applying switching voltages to the gate terminals of the two SCRs. Even very small differences in firing times will cause the current waveforms that pass through the two SCRs to differ to the extent that the combined waveform from the two SCRs will not be appropriate for delivery to the AC motor. It has been found that slight differences in dynamic resistance and slightly different gate turn on delays make this problem difficult, if not impossible, to overcome. While the inventors have found that these issues can be somewhat alleviated by closely matching the SCRs that are used in the motor controllers, and using additional circuitry, in practice this is expensive, impractical and technically difficult.

To avoid these issues, according to embodiments of the present invention the motor controllers are controlled by one or more processors to repeatedly change which of the motor controllers current passes through such that, at any given time, alternating current from the electric power supply (230) over the electric connection path (240) only passes through one of the motor controllers (210, 220). This means that for every AC half-cycle being delivered over electrical connection (240), current only passes through one of the SCRs (211*a*, 211*b*, 221*a*, 221*b*). There is therefore no requirement to simultaneously fire two SCRs connected on the same electrical connection path between the power supply and the AC motor.

Figure 3:
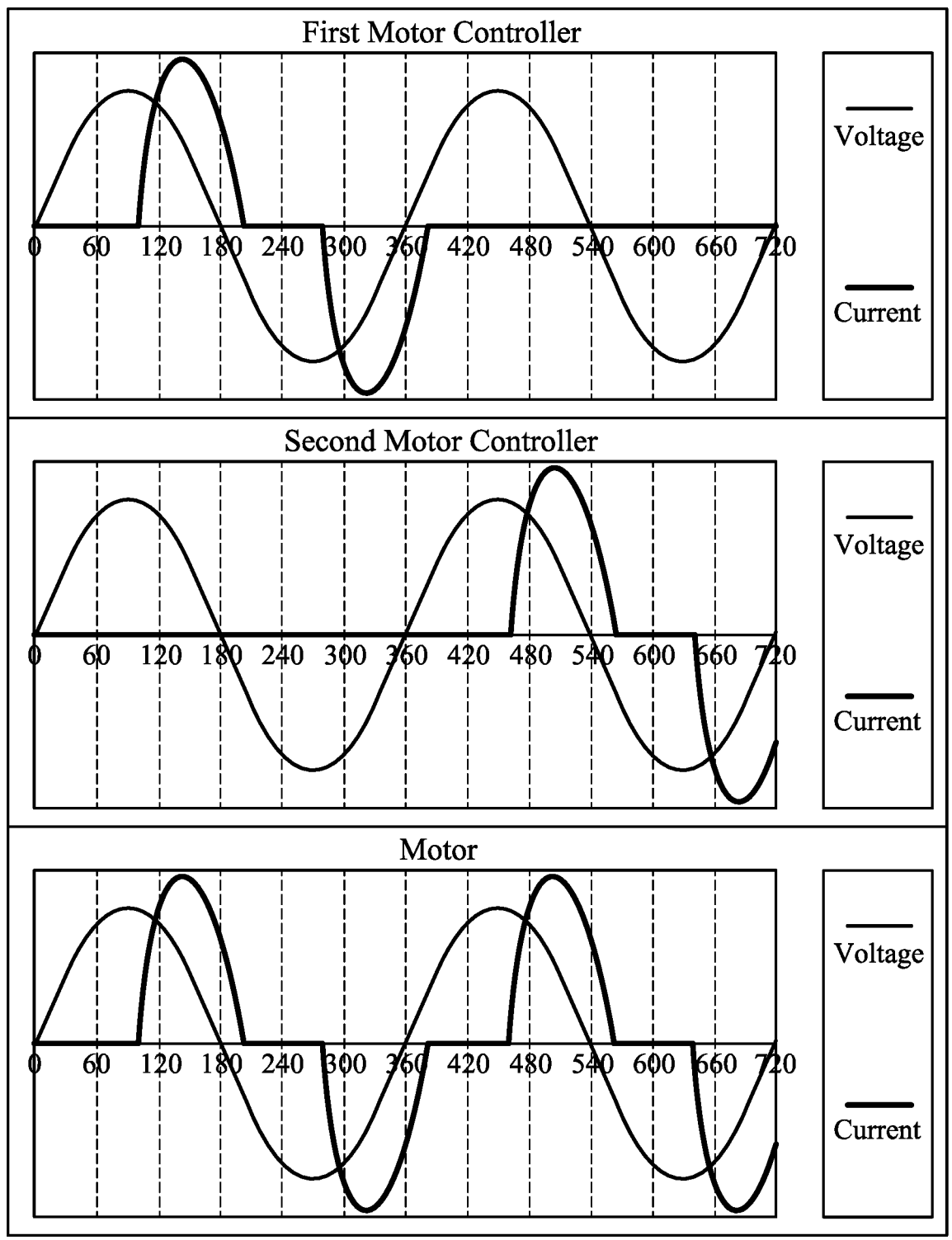
FIG. 3 shows exemplary voltage and current waveforms according the embodiment of FIG. 2.

FIG. 3 shows exemplary waveforms of the voltage of the electric power supply (230), the current through the first controller (210), the current through the second controller (220) and the current delivered to the AC motor (250), all plotted against phase angle. FIG. 3 shows two complete AC cycles, or equivalently four complete AC half-cycles.

As can be seen, at any given time current of the first phase is only passing through one of the two controllers. Current passes through the first motor controller (210) for the first AC cycle. For the first AC half-cycle, current passes through the first SCR (211*a*) of the first motor controller (210). For the second AC half-cycle, current passes through the second SCR (211*b*) of the first motor controller (210). Current passes through the second motor controller (220) for the second AC cycle. For the third AC half-cycle, current passes through the first SCR (221*a*) of the second motor controller (220). For the fourth AC half-cycle, current passes through the second SCR (221*b*) of the second motor controller (220). The total motor current, which is the sum of the current waveforms of the first and second controllers, is the same as the waveform that would be expected if only a single motor controller was used.

The average current passing through each SCR, taken over the two AC cycles shown in FIG. 3, is less than the average current that would pass through each SCR were only one motor controller used. Since the SCRs are thermally affected by a combination of the average current and RMS current, the reduction in the average current makes it possible to use motor controllers with current ratings lower than would usually be necessary given the rating of the AC motor. Even where the motor controllers (210, 220) have current ratings greater than or equal to the current rating of the AC motor (250), the reduced thermal load on the motor controllers (210, 220) can help prolong the life of the motor controllers.

It will be appreciated that since current of the first phase of alternating current only passes through one SCR at any given time, each SCR conducts the full current that is being delivered to the AC motor (250) over the electrical connection path (240) for the duration that is conducting. Although this means that the average current taken over one cycle, and the peak current, passing through an SCR may exceed the current rating of the motor controller, this is not typically a problem. The motor controllers will only be damaged by a high average current if it is either much higher than the current rating or if the high average current persists for a relatively prolonged period. By repeatedly changing the motor controller through which the current passes, the high average current does not persist for a long period. The peak current will still be well within the normal design limits of the SCRs. For example, the surge current that an SCR can handle, represented by the SCR's $I_{TSM}$ value, is typically around 5 kA for a 100 A motor controller. It will be appreciated, however, that SCRs with other $I_{TSM}$ values are available and that higher rated motor controllers may have even higher $I_{TSM}$ values.

By way of some specific examples, first consider controlling a 100 A three-phase motor. During start up the motor will draw a large current from the supply. It is usual to set a "current limit" for the motor current waveform at around three to three-and-a-half times the current rating of the motor, in this case around 350 A RMS. The current limit function prevents the RMS motor current exceeding the set level, and allows the time taken for the soft start current to reach the limit level (the 'ramp time') to naturally extend to the demands of the load. Thermally, the SCRs of a motor controller are affected by a combination of the RMS current and the average current. If the motor is controlled by a single motor controller, the RMS current will be around 350 A (the current limit) and the average current will be around 280 A. Although the average and RMS currents are higher than 100 A, it would be possible to use a single 100 A motor controller because these currents are within the design limits of a 100 A motor controller. The peak current would be around 550 A. Although the peak current is considerably higher than the current rating of the motor controller, it is still considerably below the $I_{TSM}$ of the SCRs, as explained above.

Now consider controlling a three-phase AC motor with a higher current rating of 170 A. In this case, it would not be possible to use a single 100 A motor controller. Although the peak current, which would be around 900 A, is significantly lower than the $I_{TSM}$ of the SCRs, the RMS and average currents would be outside the design limits of a 100 A motor controller. However, it would be possible to use two 100 A motor controllers connected and controlled in accordance with embodiments of the present invention, to repeatedly change which controller the current passes through such that, at any given time, current only passes through one controller. In this case, the RMS and average currents would, for one possible firing pattern, be around 420 A RMS and around 230 A average. Again, although these currents are higher than 100 A, they are within the design limits of a 100 A motor controller. While the RMS current has increased (relative to a single 100 A motor controller controlling a 100 A motor), the average current has decreased by a similar factor. As a result, the thermal loss, which depends on both the average current and the RMS current, will remain approximately the same for the two cases.

The first (210) and second (220) motor controllers are controlled to repeatedly change the motor controller through which current of the first phase passes over the first electrical connection path (240) using one or more processors or microcontrollers, not shown in FIG. 2. The one or more processors may be processors belonging to the motor controllers (210, 220), or may be one or more processors which are external to the motor controllers (210, 220). The one or more processors could also be a combination of one or more processors located external to the motor controllers and one or more processors belonging to the motor controllers (210, 220).

In one example, each motor controller (210, 220) includes a processor and memory, which may be a processor and memory of the microcontroller (215, 225). In this case, the memories store software instructions representative of a predefined 'firing pattern' or 'firing order' of the SCRs of the motor controllers. When the instructions are executed by the processors, the firing pattern is executed by applying switching voltages to the SCRs according to the firing pattern. In this way, the motor controller through which current of the first phase passes is repeatedly changed, with current only passing through one motor controller at any given time.

It will be appreciated that the memory and processors could be distributed throughout the system in any number of ways, and that the precise implementation is not important. For example, the software instructions representative of the firing pattern could be stored external to the motor controllers and delivered to the respective processors of the motor controllers to be executed. In another example still, the one or more processors and the memory are both located external to the motor controllers, and the one or more external processors control the microcontrollers of the motor controllers to execute the firing pattern.

Where the software instructions representative of the firing pattern are stored in memories of the motor controllers, the instructions could be uploaded to the memory in a number of ways. For example, the instructions could be separately uploaded to each motor controller before use, or the instructions could be uploaded or input into a master controller for dissemination to the other slave controllers.

In some embodiments, the first (210) and second (220) motor controllers each include an internal clock, and the motor controllers are controlled so as to only allow current through when the internal clock count is equal to one or more predefined values. For example, the first motor controller (210) may be controlled to only allow current through when its internal clock count is equal to an odd integer (by only firing its SCRs when the clock count is an odd integer), and the second motor controller (220) may be controlled to only allow current through when its internal clock is equal to an even integer (by only firing its SCRs when the clock count is an even integer). These predefined values are representative of the firing pattern, and so can be stored as software instructions as described above and executed by the one or more processors. Again, the firing pattern will be such that current of the first phase over the first electrical connection path (240) only passes through one motor controller at any given time, so that it is not necessary to simultaneously fire two SCRs, such as SCR 211b and 221b.

In one implementation, the internal clocks of each of the motor controllers are synchronized. For example, the internal clocks of the motor controllers may be synchronized using a logic edge derived from the voltage or current waveform of the first phase supplied by the electric power supply (230). In a particular implementation, one clock period of the internal clocks is equal to one or half an AC cycle. Synchronization of the internal clocks is described in more detail below with reference to FIGS. 7 and 8.

In some implementations, a logic edge of the voltage or current waveform is used to start the internal timers, with the SCRs then being fired relative to the voltage or current edge according to the predetermined pattern. In some cases, the SCRs are initially fired relative to voltage logic edges before changing to fire relative to current logic edges. This is because, at some point, fluctuations in the motor power factor may begin to affect the voltage edges. The current edges are not affected by such fluctuations in the motor power factor.

The firing patterns described so far, including the firing pattern illustrated in FIG. 3, are simple firing patterns in which the motor controller through which current of the first phase passes is changed each AC cycle. While such a firing pattern can be effective, it should be appreciated that any firing pattern for which current will only pass through one motor controller at any given time is consistent with the invention.

The firing pattern may be chosen so that the respective thermal limits of the first (210) and second (220) motor controllers are not exceeded, or such that the thermal loads on the first (210) and second (220) motor controllers are fairly balanced. Where two motor controllers with equal current ratings are used to control the AC motor, the motor controller through which current passes could be changed each cycle to balance the thermal load. However, where the two motor controllers have different current ratings, the firing pattern may be chosen so that the motor controller with a higher current rating passes current for more AC cycles than the motor controller with a lower current rating. The fraction of AC cycles a motor controller conducts current for may be equal, or substantially equal, to the ratio of the current rating of the motor controller and the sum of the current ratings of all of the motor controllers. Repeatedly changing the motor controller through which current of the first phase passes may be controlled on a cycle-to-cycle basis, thereby providing fine control of the thermal load on the motor controllers.

The firing pattern may be periodically repeated. For example, in implementations where the motor controllers include internal clocks, the internal clocks may reset upon reaching a reset value. In this way, a relatively short predefined firing pattern can be periodically repeated.

Firing patterns have so far been described for systems which include two motor controllers. However, any number of motor controllers greater or equal to two is consistent with the invention, and the firing pattern will depend at least somewhat on the number of motor controllers used. It will be appreciated that as the number of motor controllers increases, the complexity of the firing pattern will also increase.

Firing patterns have also so far been described for systems which include only one phase. However, as explained below, any number of phases is consistent with the invention. Where more than one phase is used, the firing pattern should take the relative ordering of the phases into account. For example, in the three-phase case described in more detail below, the phases may conventionally be ordered L1, L2, L3. However, to rotate the motor in the reverse direction, the phases may be re-ordered L1, L3, L2. In order to soft-start the motor in the reverse direction, the firing pattern may therefore need to take the change in relative order of the phases into account.

It should also be appreciated that a firing pattern is different from the firing angle. The firing angle is the phase angle that an SCR is switched on or "fired". The firing pattern is the order in which SCRs are fired. Controlling the operation of the SCRs to regulate current through the motor controllers will take into account both the firing pattern and the firing angle.

In some implementations, the current ratings of the motor controllers (210, 220) used to control the AC motor (250) are "de-rated" such that the sum of the current rating of the first (210) and second (220) motor controllers is greater than the current rating of the AC motor (250). Doubling the current rating of the AC motor (250) is, in general, not exactly offset by connecting two motor controllers (210, 220) in parallel. This can be due to a combination of different reasons, including the firing pattern (in particular whether the firing pattern balances the current between the motor controllers such that each SCR conducts for an equal amount of time), the firing angles (and the resulting waveform of an AC cycle), the number of phases, variations in contact resistance of the bypass relays (211c, 221c) and thermal performance of the SCRs. Appropriately de-rating the motor controllers therefore avoids thermal damage to the motor controllers.

De-rating the motor controllers may involve applying a de-rating factor. A de-rating factor can takes into account a number of issues, including the variation in contact resistance of the bypass relays (211c, 221c) and the thermal performance of the SCRs (211a, 211b, 221a, 221b). The thermal performance of an SCR is dependent on the power dissipated, which can be calculated according to Equation 1:

$$\text{Power} = (V_{TO} \times I_{AV}) + (r_T \cdot I_{RMS}^2) \qquad (1)$$

$V_{TO}$=threshold voltage
$I_{AV}$=average current
$r_T$=on state resistance
$I_{RMS}$=RMS current In the specific example described above, two 100 A motor controllers are used to control a 170 A AC motor. It will therefore be appreciated that the two motor controllers have been de-rated to 85 A. As previously explained, the thermal loss per motor controller, which can be calculated using Equation 1, is approximately the same for the case where two 100 A motor controllers control a 170 A motor according to embodiments of the present invention, and for the case where one 100 A motor controller controls a 100 A motor according to prior art methods.

Embodiments have so-far been explained in terms of a single phase of alternating current and two motor controllers. However, it should be appreciated that the invention can be applied to systems which include any number of phases of alternating current and any number of motor controllers greater than or equal to two.

Figure 4:
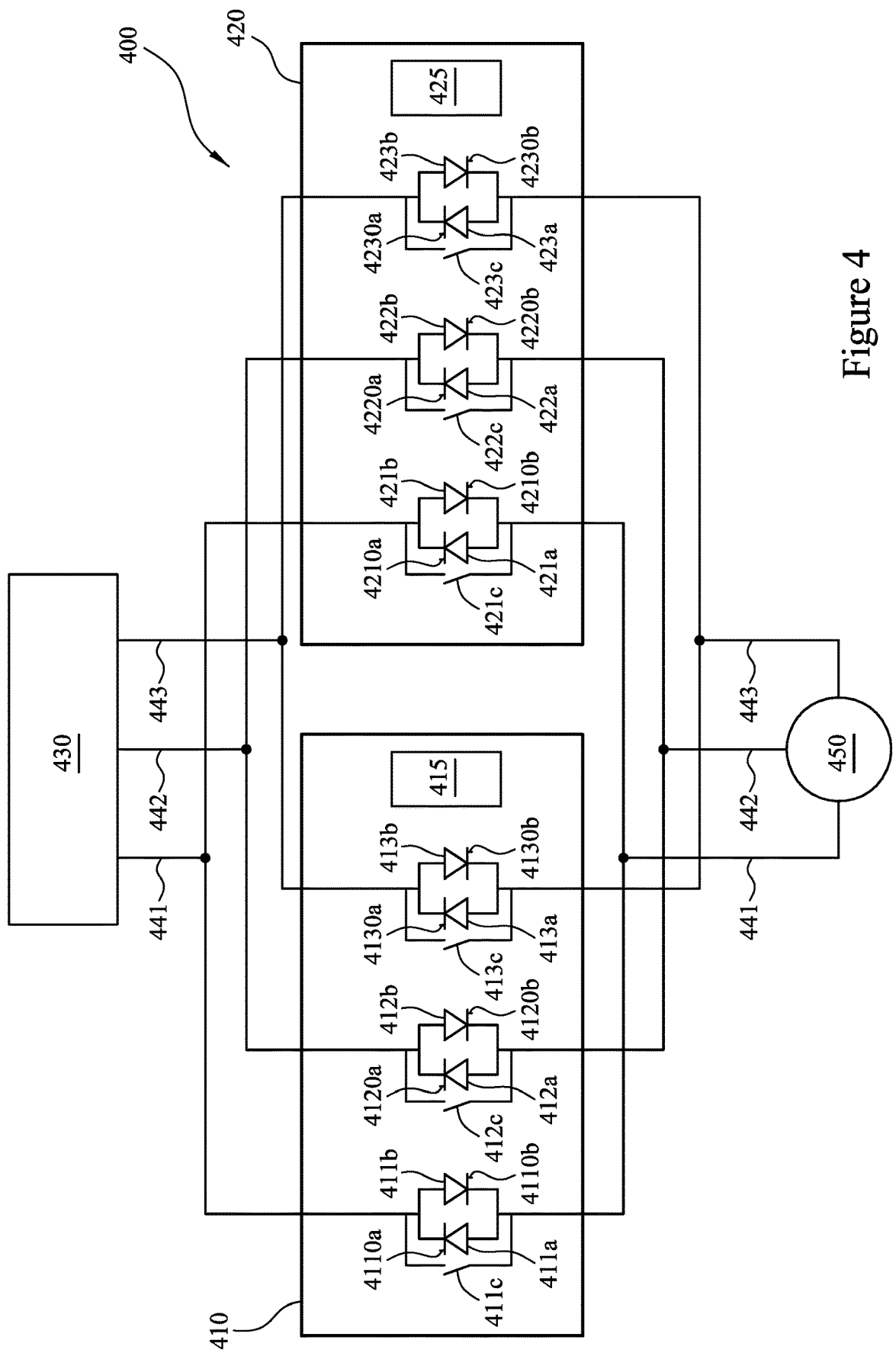
FIG. 4 is a schematic diagram of a system for controlling an AC motor according to another embodiment of the invention.

FIG. 4 shows a system (400) for controlling a three-phase AC motor (450) using two motor controllers (410, 420).

The AC motor (450) is powered by three phases of alternating current supplied by an electric power supply (430). A first phase of alternating current is delivered over a first electrical connection path (441) that connects the electric power supply (430) to the AC motor (450). Likewise, a second phase of alternating current is delivered over a second electrical connection path (442) and a third phase of alternating current is delivered over a third electrical connection path (443). Each of the two motor controllers (410, 420) are electrically connected in parallel to each of the three electrical connection paths (441, 442, 443), and are located between the electric power supply (430) and the AC motor (450).

The first motor controller (410) includes three anti-parallel pairs of SCRs, one pair per phase, and each anti-parallel pair of SCRs is connected in parallel with a bypass relay/switch (411c, 412c, 413c). As explained previously, each SCR (411a, 411b, 412a, 412b, 413a, 413b) includes first and second main terminals (the anode and cathode), and a gate terminal (4110a, 4110b, 4120a, 4120b, 4130a, 4130b). The main terminals of the first anti-parallel pair of SCRs (411a, 411b) and the respective bypass relay (411c) are electrically connected to the first electrical connection path (441) between the power supply (430) and the motor controller (450). The main terminals of the second anti-parallel pair of SCRs (412a, 412b) and the respective bypass relay (412c) are electrically connected to the second electrical connection path (442) between the power supply (430) and the motor controller (450). The main terminals of the third anti-parallel pair of SCRs (413a, 413b) and the respective bypass relay (413c) are electrically connected to the third electrical connection path (443) between the power supply (430) and the motor controller (450). As explained with respect to FIG. 2, an SCR can only conduct current in one direction. Since the polarity of the alternating current of each phase changes every half-cycle, one of the two SCRs per phase is capable of conducting current for the positive AC half-cycles of the phase while the other SCR, connected in anti-parallel to the first SCR, is capable of conducting current for negative AC half-cycles of the phase.

The first motor controller (410) also includes a microcontroller (415). The microcontroller (415) controls the operation of the SCRs (411a, 411b, 412a, 412b, 413a, 413b) and the bypass relays (411c, 412c, 413c). In particular, the microcontroller (415) can control whether a voltage is applied to the gates (4110a, 4110b, 4120a, 4120b, 4130a, 4130b) of the SCRs. As explained previously, an SCR will only conduct current when a switching voltage is applied to its gate terminal, after which the SCR will conduct current until the voltage between the anode and cathode returns to zero, which occurs after each AC half-cycle. The microcontroller can therefore control whether and when each of the SCRs (411a, 411b, 412a, 412b, 413a, 413b) can conduct current. The microcontroller can also control whether the bypass relays (411c, 412c, 413c) are open or closed. When a respective bypass relay is closed, the respective two SCRs are short-circuited and current of the respective phase will pass through the closed bypass relay rather than the SCRs.

The second motor controller (420) includes the same components as the first motor controller (410), and the microcontroller (425) of the second motor controller (420) controls the operation the SCRs (421a, 421b, 422a, 422b, 423a, 423b) and the bypass relays (421c, 422c, 423c) as explained above for the first controller.

The first (410) and second (420) motor controllers are controlled by at least one processor to repeatedly change which motor controller current of each respective phase passes through, such that at any given time alternating current of each respective phase over the respective electric connection path (441, 442, 443) only passes through one of the motor controllers (410, 420). More specifically, at any given time current of the first phase over the first electrical connection path (441) only passes through one of the motor controllers (410, 420). At any given time current of the second phase over the second electrical connection path (442) only passes through one of the motor controllers (410, 420). At any given time current of the third phase over the first electrical connection path (443) only passes through one of the motor controllers (410, 420).

The motor controllers (410, 420) are controlled in substantially the same way as described above with reference to FIGS. 2 and 3. Since each phase of the three phases is connected to a different pair of anti-parallel pairs of SCRs, each phase can be controlled essentially independently. For example, while the same firing pattern could be used for all three phases, it would also be possible to define a separate firing pattern for each phase of the three phases. Provided all firing patterns are chosen such that, at any given time, current of a given phase only passes through one motor controller, the resulting total current delivered to the AC motor will be the same.

Figure 5:
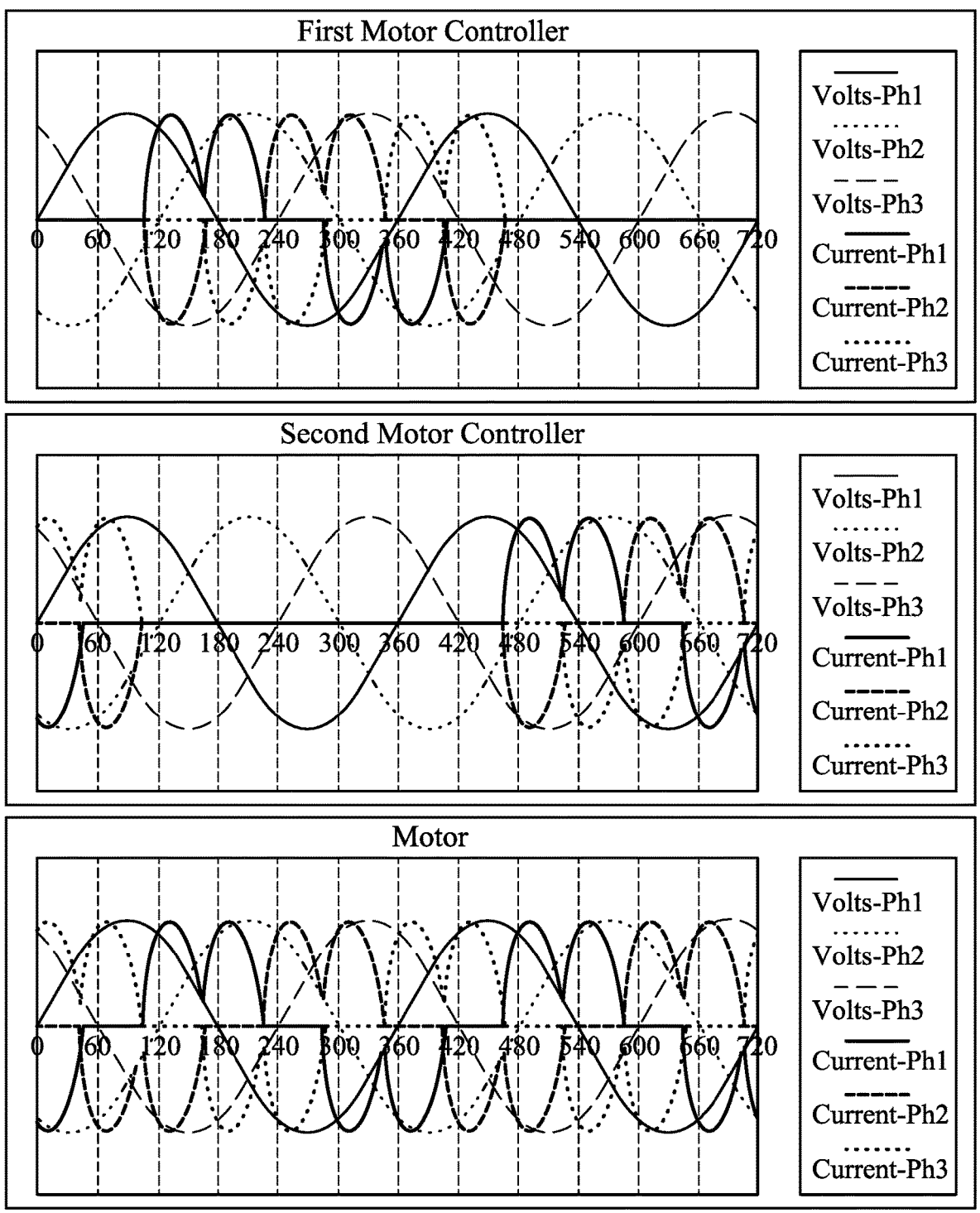
FIG. 5 shows exemplary voltage and current waveforms according to the embodiment of FIG. 4.

FIG. 5 shows exemplary voltage and current waveforms for the system described above with reference to FIG. 4. FIG. 5 shows exemplary waveforms for the voltage of each phase of the electric power supply (430), the current through first controller (410), the current through the second controller (420) and the total current delivered to the AC motor (450). All of the waveforms are plotted against phase angle, and FIG. 5 shows two complete AC cycles.

It can be seen from FIG. 5 that, for each of the three phases, current only passes through one motor controller at any given time.

Considering the waveforms of FIG. 5 in more detail, it will be appreciated that, according to the exemplary firing pattern shown, the first most controller (410) handles current for a first AC cycle and second motor controller (420) handles current for a second AC cycle. The firing delay angle is approximately 100 degrees, and the SCRs of the motor controllers are being fired relative to a voltage edge. The 'double-peak' characteristic of soft starting using a three phase supply, as will be understood by persons skilled in the art, can also be seen.

The zero-crossing of the voltage of the first phase is detected at zero degrees and the voltage edge reference generated, starting the timers of the motor controllers. Once the timers reach the firing delay angle of 100 degrees, the predetermined firing pattern is executed.

As can be seen from the waveforms of the first motor controller in FIG. 5, at 100 degrees, the positive SCR (411a) corresponding to the first phase connection (441) of the first motor controller (410) fires, as does the negative SCR (412b) corresponding to the second phase connection (442) of the first motor controller (410). Sixty degrees later, at 160 degrees, the negative SCR (413b) corresponding to the third phase connection (443) of the first motor controller (410) fires, as does the positive SCR (411a) corresponding to the first phase connection (441) of the first motor controller (410). Sixty degrees later, at 220 degrees, the positive SCR (412a) corresponding to the second phase connection of the first motor controller (410) fires, as does the negative SCR (413b) corresponding to the third phase connection (443) of the first motor controller (410). Sixty degrees later, at 280 degrees, the negative SCR (411b) corresponding to the first phase connection (441) of the first motor controller (410) fires, as does the positive SCR (412a) corresponding to the second phase connection of the first motor controller (410). Sixty degrees later, a 340 degrees, the positive SCR (413a) corresponding to the third phase connection (443) of the first motor controller (410) fires, as does the negative SCR (411b) corresponding to the first phase connection (441) of the first motor controller (410). Sixty degrees later, at 400 degrees, the negative SCR (412b) corresponding to the second phase connection (442) of the first motor controller fires, as does the positive SCR (413a) corresponding to the third phase connection (443) of the first motor controller (410).

The firing pattern continues in the second motor controller (420), as can be seen from the waveforms of the second motor controller in FIG. 5. At 460 degrees, the positive SCR (421a) corresponding to the first phase connection (441) of the second motor controller (420) fires, as does the negative SCR (422b) corresponding to the second phase connection (442) of the second motor controller (420). Sixty degrees later, at 520 degrees, the negative SCR (423b) corresponding to the third phase connection (443) of the second motor controller (420) fires, as does the positive SCR (421a) corresponding to the first phase connection (441) of the second motor controller (420). Sixty degrees later, at 580 degrees, the positive SCR (422a) corresponding to the second phase connection of the second motor controller (420) fires, as does the negative SCR (423b) corresponding to the third phase connection (443) of the second motor controller (420). Sixty degrees later, at 640 degrees, the negative SCR (421b) corresponding to the first phase connection (441) of the second motor controller (410) fires, as does the positive SCR (422a) corresponding to the second phase connection of the second motor controller (420). The final portion of the firing pattern continues outside of the phases plotted in FIG. 5, although the final portion of the previous firing cycle can be seen from zero to 100 degrees.

The firing pattern shown in FIG. 5 and described above may be represented by Table 1, with the two columns representing SCRs that are fired at the same time:

TABLE 1

| | | |
|---|---|---|
| 411a | 412b | First Controller |
| 413b | 411a | (410) |
| 412a | 413b | |
| 411b | 412a | |

TABLE 1-continued

| | | |
|---|---|---|
| 413a | 411b | |
| 412b | 413a | |
| 421a | 422b | Second Controller |
| 423b | 421a | (420) |
| 422a | 423b | |
| 421b | 422a | |
| 423a | 421b | |
| 422b | 423a | |

Various other aspects of FIG. 5, which also apply to soft starting an AC motor using a single motor controller as is known in the art, will be apparent to persons skilled in the art. Firstly, it will be understood that SCRs of different phases and directions are being fired simultaneously. This is necessary at longer firing delays, such as 100 degrees, to provide a return path for the AC current. As the firing delay is reduced over the course of the soft start, it eventually becomes unnecessary to simultaneously fire SCRs of different phases. This is because, at shorter firing delays, at the time of firing of an SCR, previously fired SCRs of other phases will still be conducting. Secondly, persons skilled in the art will understand that while FIG. 5 shows SCRs firing relative to a voltage edge, at shorter firing delays, where the motor power factor may fluctuate, the system may change to fire SCRs relative to a current edge. Thirdly, persons skilled in the art will understand that the firing delay angle takes into account the lag between the voltage and the current that exists because of the impedance of the load. If and when the system changes to fire SCRs relative to a current edge, this lag will again need to be taken into account.

Figure 6:
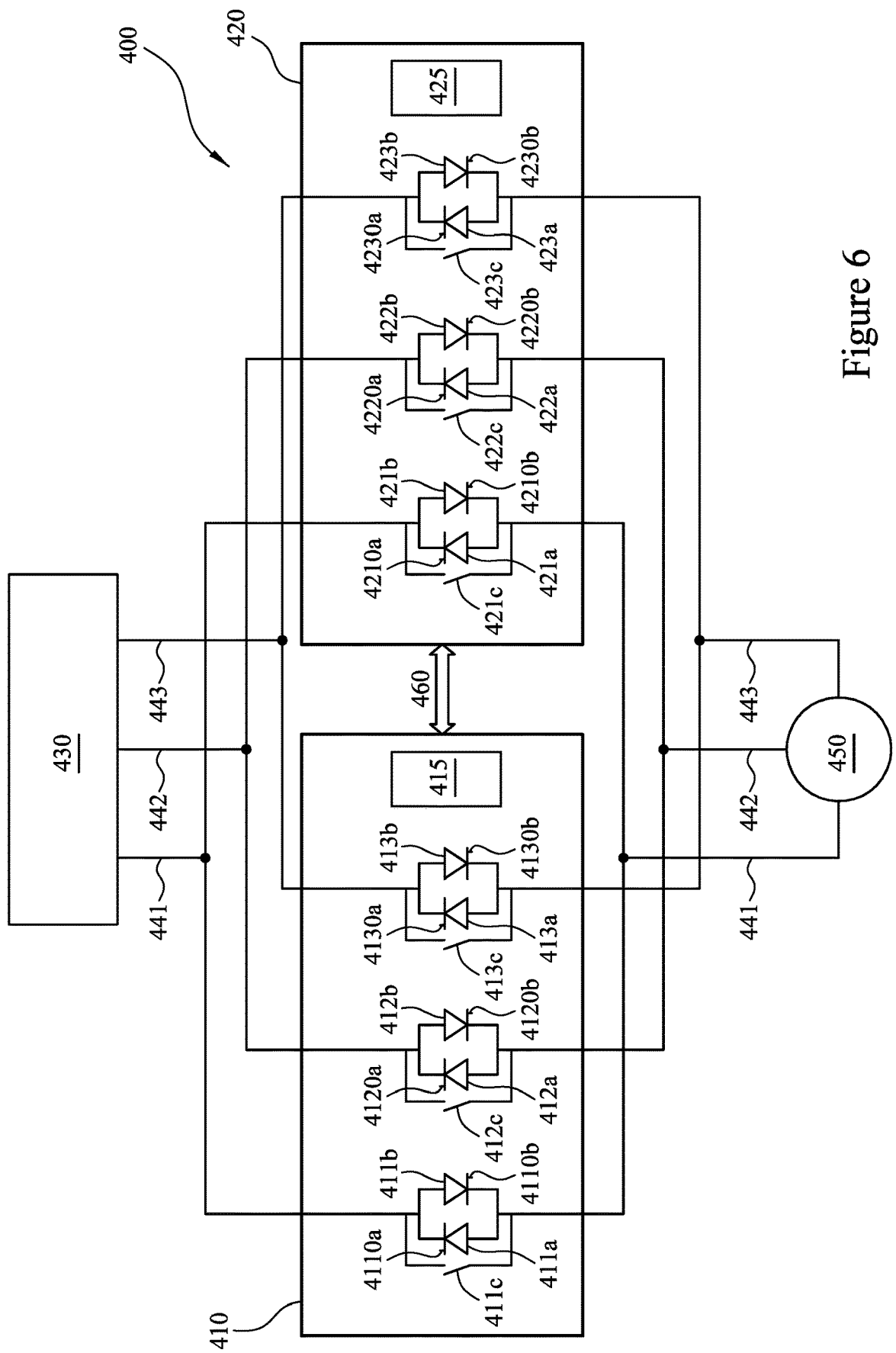
FIG. 6 is a schematic diagram of a system for controlling an AC motor which includes a control connection between a master motor controller and a slave motor controller, according to another embodiment of the invention.

FIG. 6 shows a system (600) for controlling an AC motor (450) which implements a master-slave configuration or topology. The system includes the same elements as the system (400) described above with reference to FIG. 4, but the first motor controller (410) is configured as a 'master' motor controller, the second motor controller is configured as a 'slave' controller and the master (410) and slave (420) are connected by a control connection (460).

In the master-slave topology, the master motor controller (410) is configured to provide control of the slave motor controller (420) by exchanging control data with the slave motor controller (420) over the control connection (460). The level of control and the type of control data exchanged can vary according to the implementation, but can include one or more of:
  Synchronization of the internal clocks of the master controller and slave controller;
  Parameter settings, such as firing delay angles, start current limit level, start and stop times, and start and stop pedestal;
  Modes of operation;
  Start/Stop commands;
  Firing patterns.

Some parameters, such as firing angles, need to be transmitted on a cyclic basis (every 10 ms, for example). Others, such as the start and stop time, do not need to be transmitted cyclically. In some embodiments, the master controller (410) sends an 'initialization telegram', or similar communication, to the slave controller (420) to transfer many parameters at once at the beginning of operation.

The control connection (460) can include one or more serial connections and one or more hardware handshake lines. Hardware handshake lines are preferred for exchanging data where reliability and speed are important, such as for some aspects of synchronization of the operation of the master and slave. Information that may be provided to the slave in advance of operation, such as firing patterns and firing angles, could be exchanged over a serial connection. Parameter settings, modes of operation and start/stop commands could also be exchanged over a serial connection.

While the master-slave topology has been described with reference to a system (600) with two motor controllers (410, 420) and three phases, it will be appreciated that it could be applied to a system with more than two controllers and any number of phases. It will also be appreciated that where there is more than one slave controller, various connection topologies can be used, such that the master controller is connected to the slave controllers by one or more control connections (460). For example, each slave controller could be connected to the master controller by a separate control connection (a 'star' topology). Alternatively, a line topology, a bus topology, or any other known kind of connection topology could be used.

Figure 7:
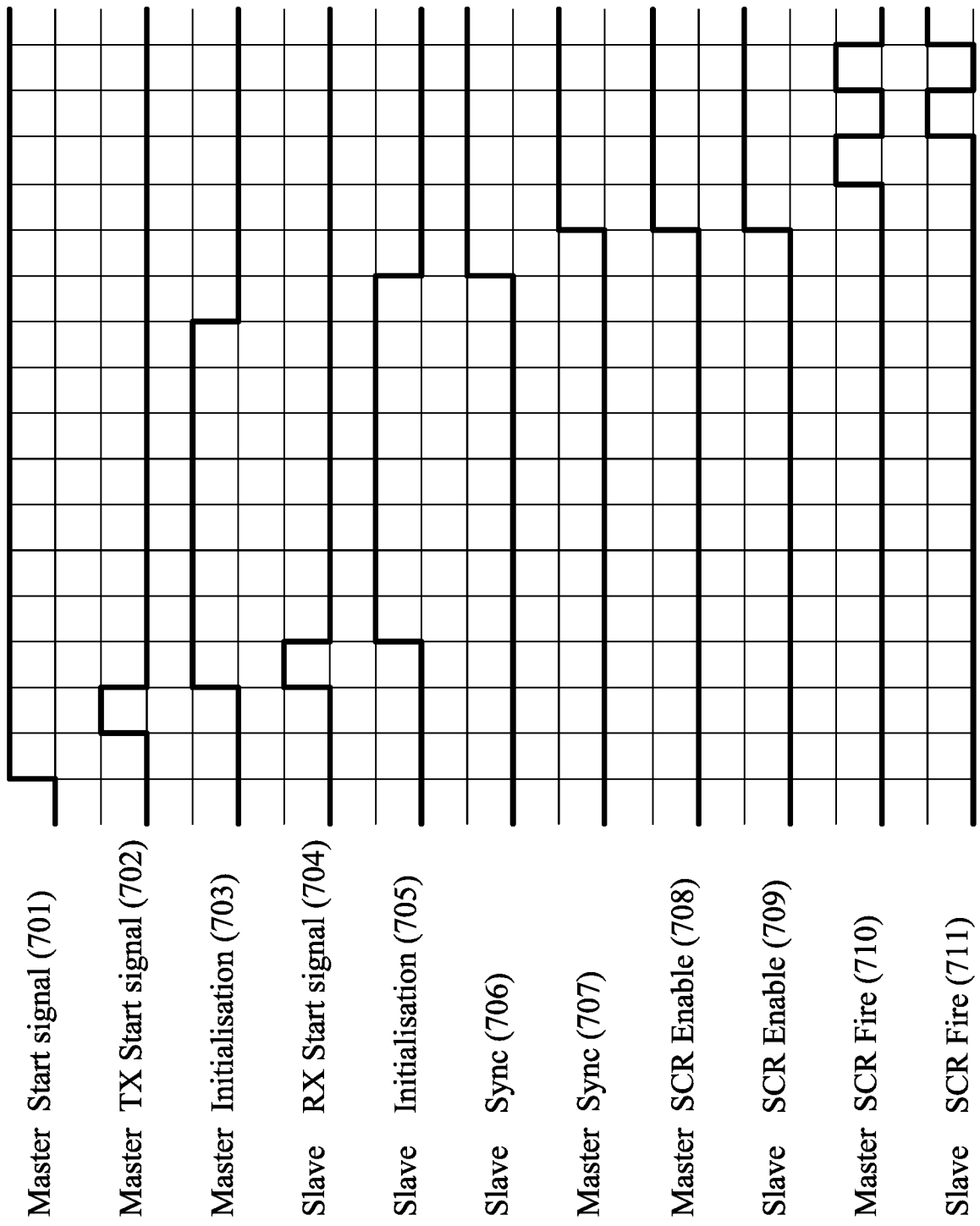
FIG. 7 illustrates the synchronization of internal clocks of two motor controllers according to an embodiment of the invention.
Figure 8:
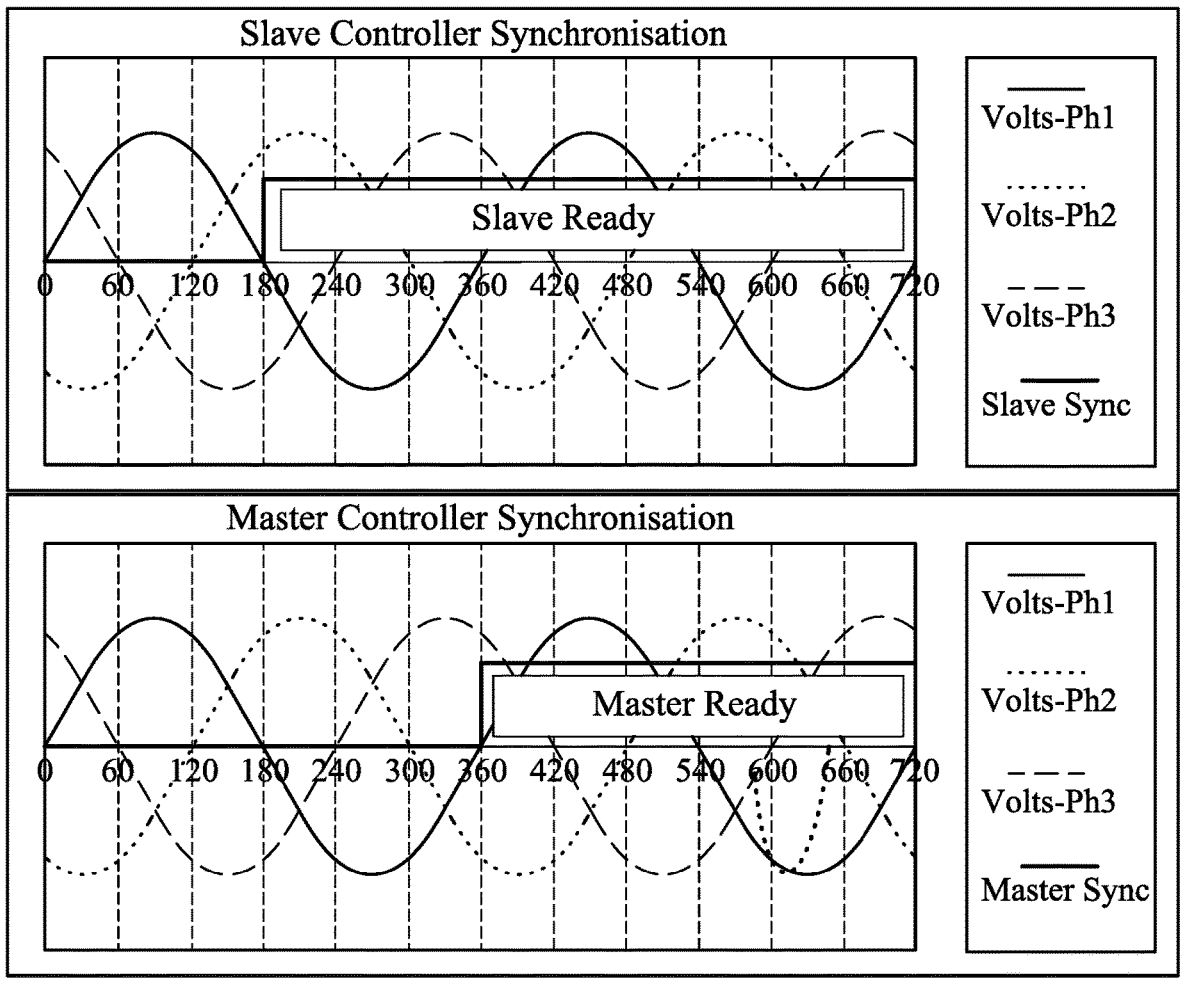
FIG. 8 illustrates the synchronization of internal clocks of two motor controller according to an embodiment of the invention.

FIGS. 7 and 8 illustrate an example of how the internal clocks of a master motor controller (410) and a slave motor controller (420) can be synchronized prior to use, so that the master controller (410) and slave controller (420) start the firing pattern on exactly the same logic edge of the supply (430). Synchronizing the clocks of the motor controllers ensures reliable operation, and also avoids the need to transmit 'firing signals' from the master controller (410) to the slave controller (420). Instead, the master and slave controllers (410, 420) can rely on their synchronized clocks and the firing pattern, which can be stored in a memory as described above with reference to FIGS. 2 and 3.

Referring to FIG. 7, the start of the synchronization process is triggered when the master controller (410) receives a signal (701) indicating that the process should start. This signal (701) may be received via a hardware switch, for example. In response to receiving the start signal (701), the master controller (410) transmits a start signal (702) to the slave controller (420) over the control connection (460) to indicate that the slave controller (420) should begin the synchronization process. Where the control connection (460) includes one or more serial connections and one or more hardware handshake lines, the start signal (702) may be transmitted to the slave controller (410) via serial connection.

Having transmitted the start signal (702) to the slave controller (420), the master controller (410) can begin its initialization sequence (703). This involves the master controller detecting the frequency and phase rotation from the incoming logic signals, as well as performing some further initialization processes not governed by the supply. The logic signals may be square waves or impulses which transition from a binary zero to a binary one at a particular supply voltage or current.

In the meantime, the slave controller (420) receives (704) the signal (702) indicating it should start the synchronization process and begins its own initialization sequence (705). Independently from the master controller (410), the slave controller (420) detects the frequency and phase rotation from the incoming three phase logic signals and performs further initialization processes not governed by the supply.

The time taken for the slave controller (420) to initialize will generally differ somewhat from the time taken by the master controller (410) to initialize. As a result, the motor controllers (410, 420) do not simply begin executing the firing pattern once their respective initialization sequences (703, 705) are complete. Instead, once the slave controller (420) has completed its initialization sequence (705), it transmits a synchronization signal (706) to the master controller (410) to indicate that it is error free and ready for operation. Having received the synchronization signal (706) from the slave controller (420), provided the master controller (410) has completed its own initialization (703), the master controller (410) transmits a synchronization signal (707) to the slave controller (420) to indicate that it is also error free and ready for operation. FIG. 8 shows the slave controller (420) setting its synchronization state high once its initialization sequence is complete, and shows the master controller (410) setting its synchronization state high once its initialization sequence is complete and it has received the synchronization signal (706) from the slave controller (420).

Having transmitted its synchronization signal (707) to the slave controller (410), the master signal enables (708) its SCRs so that can begin its timer and begin executing (710) the firing pattern based on its timer once the next logic edge arrives. Likewise, once the slave controller (420) receives the synchronization signal (707) from the master controller (410), it enables (709) its SCRs so that it can begin its timer and begin executing (711) the firing pattern using its timer once the next logic edge arrives. It will be appreciated that FIG. 7 shows the transmission and reception of the synchronization signal (707) from the master controller (410) to the slave controller (420), as well as the enabling (708, 709) of the SCRs, occurring at essentially the same time. This is because these steps are time critical, and so, where the control connection (460) includes one or more serial connections and one or more hardware handshake lines, the synchronization signals may be transmitted via hardware handshake line. In contrast, there is shown to be a delay between the sending and receipt of the signals for steps which are not time critical (for example, the sending (702) and receipt (704) of the start signals, which may be via serial connection).

FIG. 9 illustrates the operation of a system for controlling a three-phase AC motor using two motor controllers with synchronized internal clocks. FIG. 9 shows the operation over two AC cycles.

It can be seen from FIG. 9 that each of the motor controllers has an internal clock with a count that increases by one increment each AC-half cycle, and resets every fourth half-cycle. The firing pattern is executed over the course of the four half-cycles, and then repeats once the clock resets.

While clock synchronization has been described as a way of ensuring reliable master-slave operation, other embodiments of the invention use alternative approaches. One such alternative involves the use of a 'token passing' system. According to this approach, the master controller (410) is connected to the one or more slave controllers (420) by control lines which can be set 'high' or 'low'. A slave controller can only fire its SCRs when its control line is set to high, or when it 'has the token'. Initially, the master controller has the token and the control lines are set to low, so only the master controller (410) has enabled SCRs. To execute the firing pattern, the master controller repeatedly alters the state of the control lines to 'pass the token' so that the SCRs of the respective slave controllers can be fired according to the firing pattern. It will be appreciated that, depending on the number of phases being used and the complexity of the firing pattern, there may be more than one token. The control lines may be hardware lines, as it is desirable for the token to be passed quickly and reliably.

While the invention has been described in terms of SCR-based motor controllers, other kinds of motor controllers may be used. For example, the motor controllers may be variable frequency drives (VFDs) connected in parallel and controlled to repeatedly vary the VFD which delivers current of a phase to the AC motor, such that at any given time current of the phase is only delivered by one VFD.

While the invention has been described in terms of the control of an AC motor using motor controllers, such as SCR-based motor controllers, embodiments of the invention could also be applied to the control of other devices, and particularly those which use SCR-based controllers. For example, embodiments of the invention may be used to control DC bridges, lighting and heaters. Such devices may also require soft starting by controllers, such as SCR-based controllers, and so connecting two or more controllers in parallel and controlling them to repeatedly change the controller that current of a given phase passes through, such that at a given time current of the phase only passes through one controller, is not limited to the control of AC motors. Embodiments of the invention may therefore also provide a system for controlling an alternating current device comprising: an electrical connection path for connecting an electrical input of the device to a first phase of alternating current from an electric power supply; two or more device controllers, each controller located on the electrical connection path between the electric power supply and the device and being operable to regulate current of the first phase passing through it, and each controller being connected in parallel, relative to the other controllers, to the electrical connection path; the system further comprising at least one processor configured to control the device controllers to repeatedly change which of the device controllers current of the first phase passes through, such that at any given time current of the first phase over the electrical connection path only passes through one of the device controllers. Such devices could be controlled in accordance with any of the additional optional features described herein.

Described above are a number of embodiments with various optional features. It should be appreciated that, with the exception of any mutually exclusive features, any combination or one or more of the optional features are possible.

The invention claimed is:

1. A system for controlling an electrical device comprising:
   an electrical connection path for connecting an electrical input of the device to a first phase of alternating current from an electric power supply;
   two or more device controllers, each controller located on the electrical connection path between the electric power supply and the device and being operable to regulate current of the first phase passing through it, and each controller being connected in parallel, relative to the motor controllers, to the electrical connection path;
   the system further comprising
   at least one processor configured to control the controllers to repeatedly change which of the controllers current of the first phase passes through, such that at any given time current of the first phase over the electrical connection path only passes through one of the controllers.

2. A system for controlling an electrical device according to claim 1 wherein each of the controllers has a current rating less than the current rating of the electrical device.

3. A system for controlling an electrical device according to claim 2 wherein at least one the controllers has a de-rated current rating such that the sum of the current ratings of the two or more controllers is greater than the current rating of the electrical device.

4. A system for controlling an electrical device according to claim 1 wherein the at least one processor is configured to control the controllers to repeatedly change which of the controllers current of the first phase passes through in such a way that the respective thermal limit of each respective controller is not exceeded.

5. A system for controlling an electrical device according to claim 4 wherein the at least one processor is configured to control the controllers to repeatedly change which of the controllers current of the first phase passes through such that the fraction of time current of the first phase passes through each respective controller is substantially equal to the ratio of the current rating of the respective controller to the sum of the current ratings of all of the controllers.

6. A system for controlling an electrical device according to claim 1 wherein the at least one processor is configured to control the controllers to repeatedly change which of the controllers current of the first phase passes through in such a way as to balance the thermal load on each respective controller.

7. A system for controlling an electrical device according to claim 1 wherein the at least one processor is configured to control the controllers to repeatedly change which of the controllers current of the first phase passes through on a cycle-to-cycle basis.

8. A system for controlling an electrical device according to claim 1 wherein the at least one processor is configured to control the controllers to repeatedly change which of the controllers current of the first phase passes through according to a predefined sequence.

9. A system for controlling an electrical device according to claim 8 wherein the at least one processor is configured to periodically repeat the predefined sequence.

10. A system for controlling an electrical device according to claim 9 wherein the number of AC cycles per period of the predefined sequence is an integer multiple of the number of controllers.

11. A system for controlling an electrical device according to claim 1 wherein each of the controllers comprises an internal clock; wherein the at least one processor is configured to synchronize the internal clocks.

12. A system for controlling an electrical device according to claim 11 wherein the at least one processor is configured to synchronize the internal clocks using a logic edge derived at least in part from a voltage or current waveform of the first phase of alternating current from the electric power supply.

13. A system for controlling an electrical device according to claim 11 wherein the one or more processors control the controllers such that current of the first phase only passes through a respective controller when a clock count of the internal clock of the respective controller is equal to one or more respective predefined values.

14. A system for controlling an electrical device according to claim 11 wherein the internal clock of each controller is configured to reset when a clock count of the internal clock reaches a reset value.

15. A system for controlling an electrical device according to claim 1 wherein one of the controllers is a master controller and all remaining controllers are slave controllers, the master controller being configured to provide control data to the slave controllers over one or more control connections.

16. A system for controlling an electrical device according to claim 1 wherein each controller comprises a pair of silicon controlled rectifiers, SCRs, for each electrical connection path, each pair of SCRs being connected in anti-parallel.

17. A system for controlling an electrical device according to claim 1 wherein each the electrical device is an AC motor and the device controllers are motor controllers.

18. A master controller for use as one of the two or more controllers in a system according to claim 1, the master controller being operable to regulate current of the first phase passing through it, and the master controller further comprising:
- an input to receive data indicative of an order or sequence to repeatedly change which of the controllers current of the first phase passes through; and
- at least one output to provide control data to the one or more other controllers to carry out the order or sequence.

19. A method for controlling an electrical device comprising:
- controlling two or more device controllers,
  - each of the controllers being located on an electrical connection path between the device and a power supply configured to supply a first phase of alternating current over the electrical connection path and being operable to regulate current of a first phase passing through each respective controller, and each of the controllers being connected in parallel, relative to the other controllers, to the electrical connection path;
- wherein controlling the two or more controllers comprises:
  - repeatedly changing which of the controllers current of the first phase passes through such that at any given time current of the first phase over the electrical connection path only passes through one controller.

20. A computer program, which when executed on one or more processors cause them to carry out the method of claim 19.

* * * * *